United States Patent [19]

Idland

[11] Patent Number: 5,585,025
[45] Date of Patent: Dec. 17, 1996

[54] SPA CONTROL CIRCUIT

[75] Inventor: Carsten H. Idland, Los Angeles, Calif.

[73] Assignee: Softub, Inc., Chatsworth, Calif.

[21] Appl. No.: 118,763

[22] Filed: Sep. 13, 1993

[51] Int. Cl.⁶ ..................................... H05B 1/02
[52] U.S. Cl. .................. 219/497; 219/485; 219/519; 219/506; 4/541.2; 361/15
[58] Field of Search .................... 219/491, 519, 219/492, 497, 501, 506, 485, 481, 505; 307/117, 119; 4/541.1, 545, 584, 541.2; 361/2, 15

[56] References Cited

U.S. PATENT DOCUMENTS

| | | | |
|---|---|---|---|
| 3,745,308 | 7/1973 | Lefferts | 219/499 |
| 4,349,434 | 9/1982 | Jaworski | 210/149 |
| 4,421,270 | 12/1983 | Raleigh et al. | 236/20 R |
| 4,593,177 | 6/1986 | Trostle | 219/328 |
| 4,658,320 | 4/1987 | Hongel | 361/13 |
| 4,780,917 | 11/1988 | Hancock | 4/544 |
| 4,843,659 | 7/1989 | Popovich et al. | |
| 4,858,254 | 8/1989 | Popovich et al. | |
| 4,981,543 | 1/1991 | Popovich et al. | |
| 5,092,951 | 3/1992 | Popovich et al. | |
| 5,095,559 | 3/1992 | Liljegren et al. | 4/542 |
| 5,133,818 | 7/1992 | Popovich et al. | |
| 5,267,120 | 11/1993 | Graff et al. | 361/185 |
| 5,308,957 | 5/1994 | Huffington | 210/483 |

Primary Examiner—Mark H. Paschall
Attorney, Agent, or Firm—Kelly Bauersfeld & Lowry

[57] ABSTRACT

A spa control circuit is provided for regulating a water circulation and heating system in a spa or hot tub or the like. The control circuit comprises a thermostat circuit and a high temperature limit circuit, both of which receive a temperature signal from a common temperature sensor. A safety circuit responds to sensor failure to prevent operation of the circulation/heating system. A latching relay ensures system reset in the same operational state following a power outage. An arc suppression circuit substantially prevents arc damage to relay contacts subjected to frequent opening and closing in response to on-off cycling of the thermostat circuit. In a preferred form, the control circuit components are mounted within a compact housing having a heat transfer member in heat exchange relation with circulating spa water, whereby the spa water is used to prevent overheating of the control circuit components.

12 Claims, 4 Drawing Sheets

SPA CONTROL CIRCUIT

BACKGROUND OF THE INVENTION

This invention relates generally to therapeutic spas and hot tubs and the like. More specifically, this invention relates to improvements in a spa control circuit for regulating a water circulation and heating system, wherein the circulation/heating system provides jets of heated water to a spa interior.

Spas and hot tubs are generally known in the art for relaxation and other therapeutic purposes. In general terms, the spa or hot tub comprises an upwardly open tub structure for receiving and storing a supply of water, wherein the tub structure has a size and shape sufficient for substantial immersion of one or more persons. A water circulation and heating system is normally provided, to include a pump for circulating water from the spa interior through a filter and a heater, and for return flow to the spa. The filtered and heated water is normally returned to the spa in the form of a plurality of pressurized water jets, often including entrained air, wherein these jets provide a vigorous and therapeutic massage action.

The water circulation and heating system for the spa or hot tub commonly includes a control circuit for regulating water temperature and to prevent overheating. More specifically, in a typical spa control circuit, a thermostat circuit responds to actual water temperature as detected by a temperature sensor to cycle the system heater between on-off states for purposes of maintaining the water temperature within a predetermined range, such as between about 100 to 110 degrees Fahrenheit. In addition, the control circuit commonly includes a high temperature limit circuit which responds to a separate temperature sensor to deactivate the heater when an upper end limit temperature limit is reached, such as about 120 degrees Fahrenheit.

One preferred spa construction is shown and described in U.S. Pat. Nos. 4,843,659; 4,858,254; 4,981,543; 5,092,951; and 5,133,818, which are incorporated by reference herein. In accordance with this spa design, a relatively lightweight tub structure is formed from insulative foam plastic walls. The water circulation and heating system comprises a motor-driven pump for drawing spa water through a filter and for returning the filtered water in the form of jets to the spa interior. A portion of the circulated water is passed in heat transfer relation with the pump motor, whereby the pump motor comprises the heat source for elevating the temperature of the spa water. A thermostat circuit and a high temperature limit circuit are respectively provided for regulating water temperature within a normal operational range, and to prevent water overheating.

While the above-referenced spa construction beneficially provides a cost-efficient and energy-efficient system, certain failure mode conditions can occur to result in undesired operation, such as inadvertent overheating of the spa water. For example, temperature sensor failure can be interpreted by the control circuit as a drop in water temperature, thereby incorrectly signaling the control circuit to operate the circulation/heating system in a manner elevating the water temperature above acceptable limits. As another example, repeated on-off cycling of the thermostat circuit can result in arc damage of relay contacts used to connect and disconnect a power supply to the pump motor.

The present invention overcomes these and other problems encountered in the prior art by providing an improved control circuit for use with a spa or hot tub or the like, wherein the control circuit includes safety features to prevent water overheating as a result of control circuit component failure. The improved control circuit also includes arc suppression means to protect relay contacts from damage due to arcing.

SUMMARY OF THE INVENTION

In accordance with the invention, an improved control circuit is provided for a spa or hot tub or the like to regulate operation of a water circulation and heating system. The control circuit comprises a thermostat circuit and a high temperature limit circuit, both of which respond to signals from a temperature sensor to regulate water temperature. The control circuit includes safety means responsive to temperature sensor failure to prevent inadvertent overheating of the spa water.

In the preferred form, the spa control circuit includes a single temperature sensor for detecting the temperature of the spa water, and for generating a signal representing water temperature. This temperature signal is supplied to the thermostat circuit which on - off cycles a thermostat relay to activate and deactivate a heater in a manner maintaining water temperature between normal operating limits. An arc suppression circuit connected across the contacts of the thermostat relay prevents or minimizes arc damage to the relay contacts in the course of frequent opening and closing movement.

The same temperature sensor provides the temperature signal to the high temperature limit circuit which in turn controls a high limit relay in a manner deactivating the heater if and when the water temperature increases to a preset upper end limit. A safety circuit is provided in combination with the high temperature limit circuit, wherein the safety circuit detects failure of the temperature sensor and responds to such failure to open the high limit relay and thereby deactivate the system heater. As a result, the safety circuit prevents overheating of the spa water, wherein such overheating could otherwise occur due to erroneous temperature-indicative signals from the failed temperature sensor.

In accordance with further aspects of the invention, the high temperature limit circuit includes a latching relay for maintaining the state of the high temperature limit circuit upon power resumption following a power outage. In this regard, the latching relay ensures that the high limit relay will reset in a closed position for normal system operation when power is resumed following a power outage, provided that the high limit relay was in the closed operational position when power was interrupted. If the high limit relay was in an open position when the power outage occurred, the latching relay maintains that open position when power supply is resumed, pending manual reset.

The components of the spa control circuit are desirably packaged within a compact housing having a heat transfer member defining a portion of said housing. With this construction, the circuit-containing housing can be mounted in heat transfer relation with the circulating spa water, whereby heat generated by the circuit components is transferred to the circulating spa water. Thus, spa water provides a cooling medium to prevent overheating of the circuit components, while the circuit components contribute to heating of the spa water. In the preferred system, the heater comprises a pump motor used to drive a pump element for circulating water through a filter. A portion of the circulating water is directed through a flow path including a heat transfer coil wrapped spirally about the pump motor so that the water temperature is elevated by heat generated by said motor. The circuit-containing housing is mounted with its heat transfer member in thermal communication with the heat transfer coil.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
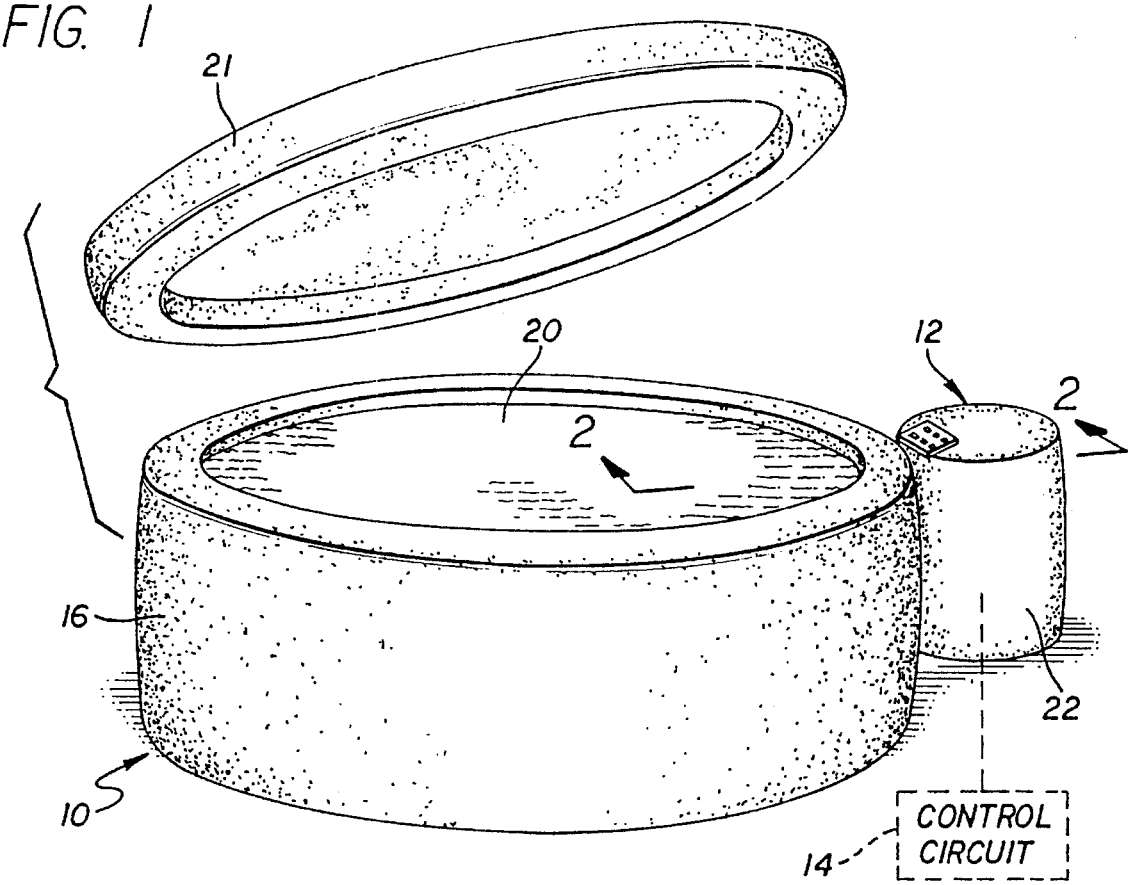
FIG. 1 is a perspective view illustrating an exemplary spa or hot tub having a water circulation and heating system, and including an improved control circuit embodying the novel features of the invention.
Figure 2:
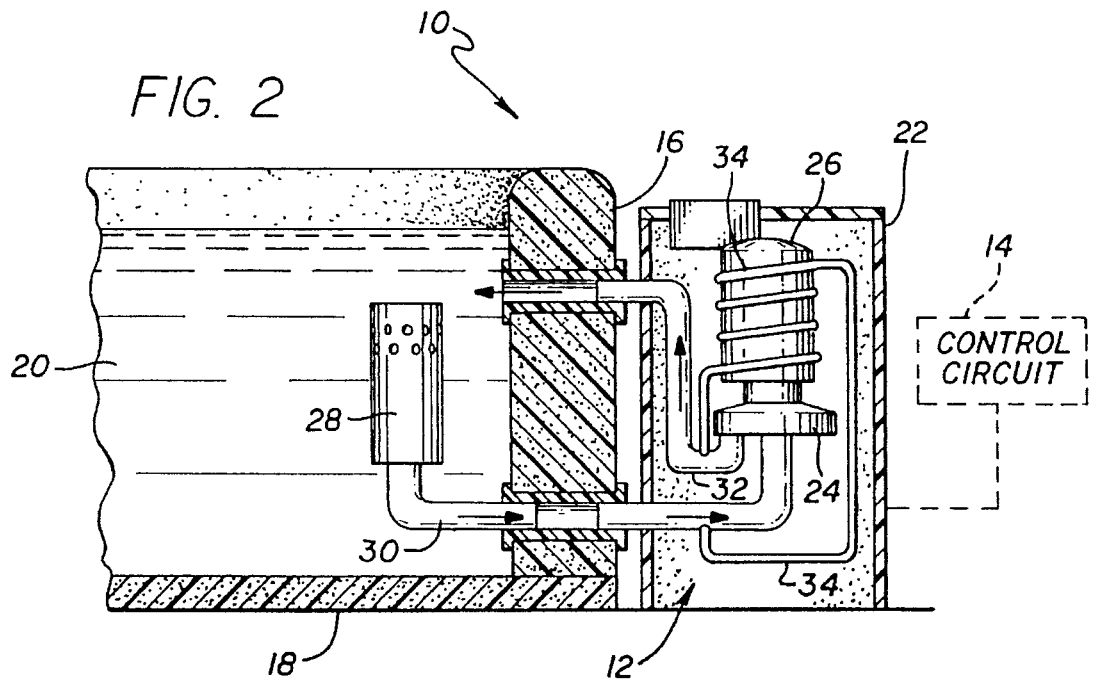
FIG. 2 is an enlarged fragmented vertical sectional view taken generally on the line 2—2 of FIG. 1.

As shown in the exemplary drawings, a spa or hot tub referred to generally by the reference numeral 10 in FIGS. 1 and 2 includes a water circulation and heating system 12, in combination with an improved spa control circuit 14. The circulation/heat system 12 draws water from the interior of the spa 10 for filtering and heating, and for return to the spa in the form of a plurality of therapeutic jets. The control circuit 14 operates the circulation/heating system 12 in a manner regulating spa water temperature while safeguarding against overheating which might otherwise occur during certain failure modes.

In general terms, the spa 10 comprises an upwardly open tub construction having an annular side wall 16 extending upwardly from the periphery of a bottom wall 18 to define the upwardly open spa interior adapted to receive and store a supply of water 20. Although the materials used in this tub construction may vary widely, a preferred construction includes soft foamed plastic walls assembled with a waterproof jacket or liner as described and shown, by way of example, in U.S. Pat. Nos. 4,843,659; 4,858,254; 4,981,543; 5,092,951; and 5,133,818, which are incorporated by reference herein. The overall size and shape of the spa 10, and the volume of water 20 contained therein, are sufficient for substantial immersion of one or more persons. The illustrative drawings show the water circulation and heating system 12 mounted substantially within a relatively compact and insulated modular case 22 disposed outside the spa 10, in close proximity therewith, such as the insulated power pack case described in copending U.S. Pat. No. 5,283,915, which is also incorporated by reference herein. An insulative cover 21 (FIG. 1) may also be provided to cover and close the spa between periods of use.

As shown best in FIG. 2, the circulation/heating system comprises a pump 24 driven by an electric motor 26 to draw water 20 from the spa interior through a filter unit 28 and further through a suction conduit 30 to the pump. The pump 24 discharges the thus-filtered water through a discharge or return conduit 32 for recirculation flow into the spa interior in the form of one or more pressurized jets. As is known in the art, these water return jets may be associated with entrained air to provide a vigorous and highly therapeutic massage action to a person or persons in the body of water 20 within the spa.

The water circulation and heating system 12 includes heating means for elevating the temperature of the circulating spa water. In this regard, FIG. 2 shows a heater flow conduit 34 extending from the return conduit 32 to the suction conduit 30 and wrapped or coiled spirally about the pump motor 26 in heat exchange relation therewith. This heater flow conduit is formed from a heat transfer material such as copper conduit or the like and passes a flow of the circulating spa water in close heat exchange relation with the pump motor 26 for heating purposes. Thus, in the exemplary system, the pump motor 26 provides the dual function of water circulation and water heating. It will be understood, however, that alternative heater devices can be used for elevating the temperature of the circulating spa water.

Figures 3, 4:
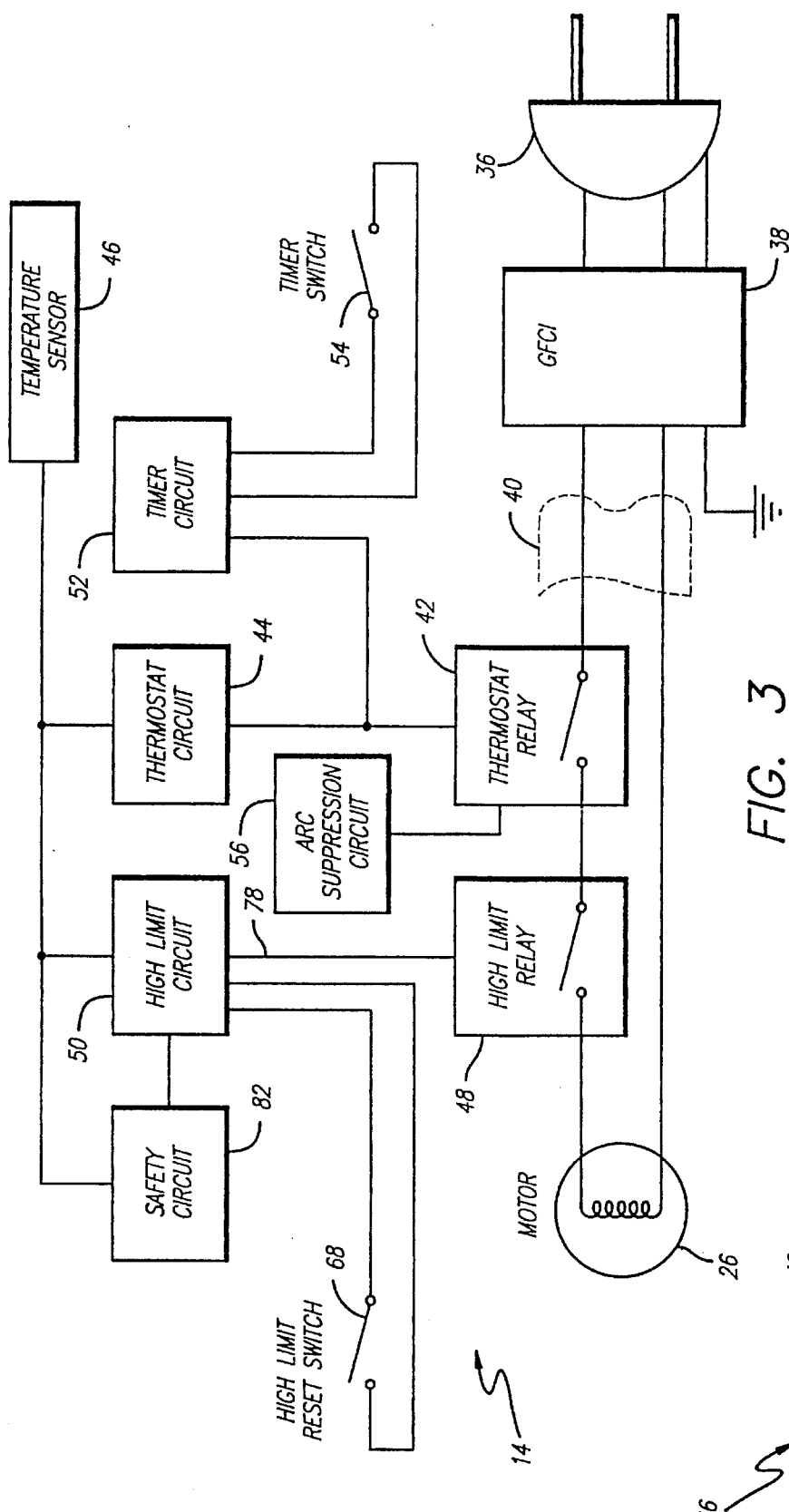
FIG. 3 is a block diagram, shown somewhat in schematic form, illustrating the improved spa control circuit of the present invention.
FIG. 4 is a fragmented circuit diagram illustrating components of an arc suppression circuit.

The improved spa control circuit 14 regulates operation of the pump motor 26 in a manner obtaining close, safe and reliable regulation of spa water temperature. In this regard, FIG. 3 illustrates the spa control circuit 14 in schematic form to include a conventional power plug 36 and a ground fault interrupter 38 for connecting the pump motor 26 via a power cord 40 to a suitable power source such as a standard household electrical circuit. A thermostat relay 42 is opened and closed in a cyclic fashion by a thermostat circuit 44 which responds to an input signal from a temperature sensor 46 used to detect actual water temperature. The thermostat circuit 44 functions generally in a conventional manner to close and open the thermostat relay 42 and thereby respectively turn the motor 26 on and off to maintain spa water temperature within the limits of a predetermined normal range of operation, such as approximately 100 to 110 degrees Fahrenheit. A high limit relay 48 is connected in series with the thermostat relay 42, and is operated by a high temperature limit circuit 50 to safeguard against overheating of the water beyond a preset upper limit, typically about 120 degrees Fahrenheit. The thermostat and high limit relays 42 and 48 both comprise, in the preferred from, solenoid-operated mechanical switches which are normally open in the absence of a closure signal from the associated thermostat circuit 44 or high temperature limit circuit 50. Thus, in the event that power supply to the plug 36 is interrupted, such as in the event of a general power outage, the relays 42 and 48 are both opened and require a positive closure signal for motor operation to resume.

The thermostat circuit 44 has a conventional construction and operation for controlling the thermostat relay 42 in response to a temperature-indicating signal from the sensor 46. In this regard, a typical and operational thermostat circuit is available from the Len Gordon Company, Las Vegas, Nev. under part number 932000-001, including a temperature sensor such as that available from National Semiconductor Corporation of Santa Clara, Calif. under model designation LM34DZ. The thermostat circuit 44 responds to the temperature-indicative signal from the sensor 46 to close the relay 42 when the water temperature falls to a predetermined low level limit, and to open the thermostat relay 42 when the water temperature rises to a predetermined upper end limit for normal operation. FIG. 3 shows a timer circuit 52 having a manually closed timer switch 54, wherein the timer circuit 52 functions to override the thermostat circuit 44 for purposes of closing the relay 42 for short time intervals. An exemplary timer circuit is available from Tridelta Corporation, of Mentor, Ohio under part number EP1217-1.

In accordance with one aspect of the invention, an arc suppression circuit 56 is connected across the contacts of the thermostat relay 42 to reduce and/or substantially eliminate arcing and resultant contact damage as the relay 42 is opened and closed. The arc suppression circuit 56 is shown in more detail in FIG. 4 to include a capacitor 58 with a series resistor 59, and a bidirectional transient voltage suppressor 60 connected across the relay contacts in parallel relation with each other. The resistor 59 acts to limit the current on closure of the relay contacts, and also to reduce current through the capacitor 58 and resistor 59 when the contacts are open. One preferred transient voltage suppressor is available from Diodes Inc. of Chatsworth, Calif. under Model No. 1.5KE22-OCA-B. These components, namely, the capacitor 58 in parallel with the transient voltage suppressor 60, function by charging the capacitor upon initial opening of the relay contacts, thereby preventing formation of a low voltage arc when the contacts are extremely close to each other. When the capacitor is charged, the persistent current begins to increase the voltage across the contacts, but the relay contacts have by this time moved apart a sufficient distance such that the breakdown voltage of the transient voltage suppressor is less than the voltage needed to form an arc across the contacts. As a result, the current flow is through the transient voltage suppressor instead of producing an arc across the relay contacts. The arc suppression circuit thus functions to protect the contacts of the relay 42 against arc damage in the course of relatively frequent on-off cycling.

Figure 5:
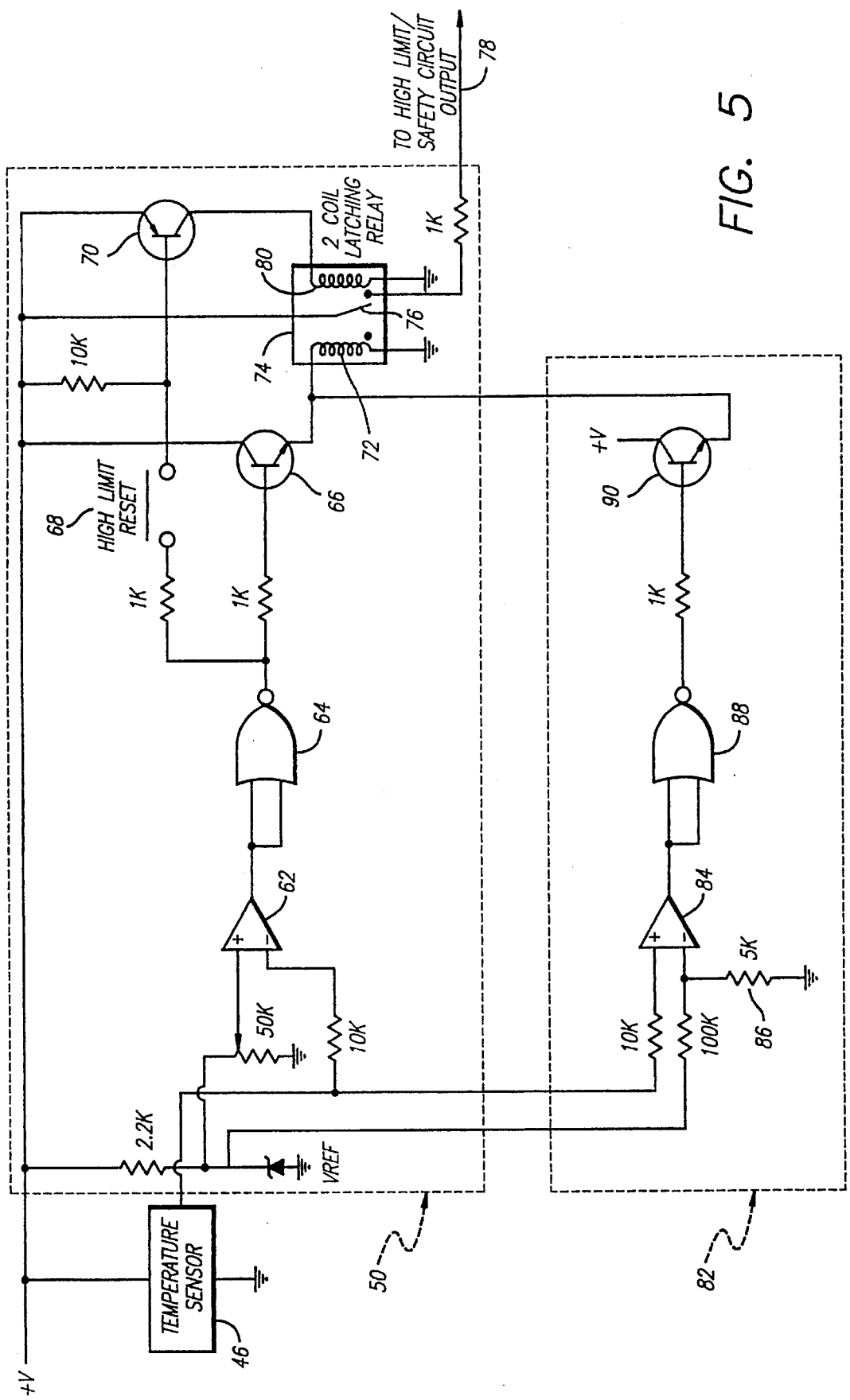
FIG. 5 is a circuit diagram illustrating the high temperature limit circuit and safety circuit of FIG. 3.

The high temperature limit circuit 50 is shown in FIG. 5 in one preferred form utilizing a positive temperature coefficient sensor. It will be understood by persons skilled in the art that a negative temperature coefficient sensor can be used, with appropriate circuit modifications. As shown, the temperature sensor 46 provides a signal representing actual water temperature to one input terminal of a comparator 62. The other input terminal of the comparator 62 receives a reference signal adjusted to correspond with a selected high temperature limit for the spa water. As long as the actual water temperature is less than the high temperature limit, the comparator produces a positive or higher output signal which is inverted by an inverter 64 to a low or negative signal. The inverter output is coupled in parallel to the base of an NPN transistor switch 66, and through a normally open and manually operated high limit reset switch 68 to the base of a PNP transistor switch 70. The low signal input to the first switch 66 is insufficient to place that switch in an "on" state, such that electrical power is not coupled to a first coil 72 of a twin-coil latching relay 74. As a result, the switch arm 76 of the latching relay 74 couples a positive voltage to an output line 78 which maintains the high limit relay 48 in a closed position (FIG. 3).

In the event that the switch arm 76 of the latching relay 74 is not already in a position coupling the positive voltage to the output line 78, momentary depression of the high limit reset switch 68 couples the low signal to the base of the second transistor switch 70, resulting in energization of a second coil 80 to draw the switch arm 76 to the normal power-on position.

If, for any reason, the water temperature increases to a level exceeding the preset upper limit, then the output of the comparator 64 is a negative signal which, after inversion by the inverter 62, becomes a high signal connected to the base of the transistor switch 66. This high signal switches the transistor 66 to an "on" state, and thus energizes the first coil 72 of the latching relay for purposes of moving the relay switch arm 76 to a power-off position. Thus, the positive voltage is removed from the high temperature limit relay 48, and motor operation is interrupted. Sub sequent depression of the high limit reset switch 68 for resumed system operation is effective to return the switch arm 76 to the power-on position only if the actual water temperature has fallen to a level below the upper limit setting.

The use of the twin-coil latching relay 74 beneficially ensures proper and desirable circuit operation following a power outage. More specifically, any power outage removes the closure signal from the output line 78 connected to the high limit relay 48 and thus opens the high limit relay. When power supply resumes, the switch arm 76 of the latching relay 74 remains in the position that it was in when power was interrupted. If the switch arm 76 was in a power-on position, the high temperature limit circuit will produce a closure signal connected to the high limit relay 48 when power supply resumes, thus ensuring resumed system operation without requiring manual reset. However, if the switch arm 76 was in a power-off position when the power supply was interrupted, the high temperature limit circuit 50 will remain in the power-off position when power supply resumes, without risk or danger of undesired resumed system operation in the absence of attended manual reset.

In accordance with further features of the invention, a safety circuit 82 is provided to detect a system failure mode involving failure of the temperature sensor 46. In that event, the temperature sensor will normally provide an output signal to the thermostat and high limit circuits 44, 50 reflective of an undesirably low water temperature level. Thus, in the absence of the safety circuit 82, the control circuit would otherwise operate the system in a manner calling for continuous heat input. Eventually, overheating of the water could result. The safety circuit 82, however, detects failure of the temperature sensor 46 and responds thereto by turning the system off.

As shown in FIG. 5, the safety circuit 82 includes a comparator 84 which receives input signals from the temperature sensor 46 and a reference signal. This reference signal may originate from the same source as the reference signal used in the high temperature limit circuit 50, with an appropriate voltage divider 86 adjusting the reference signal to a level reflective of sensor failure. When the temperature signal reflective of actual water temperature exceeds the reference signal, a positive voltage from the comparator 84 is inverted by an inverter 88 to a low state for supply to the base of another NPN switch transistor 90. This low voltage is insufficient to switch the transistor to an "on" state, and thus does not provide a positive voltage to the first coil 72 associated with the power-off state of the latching relay 74. However, in the event that the reference signal exceeds the sensor signal, thus indicating sensor failure, a negative comparator output is inverted to a high state by the inverter 88, resulting in the transistor 90 switching to an "on" state, and thus energizing the coil 72 of the latching relay 74. The switch arm 76 is thereby moved to the power-off state, resulting in opening of the high limit relay 48 and de-energization of the system motor. Once again, resumed operation cannot occur unless and until the high limit reset switch 68 is manually depressed, during a condition when the sensor signal exceeds the reference signal within the high temperature limit circuit 50. That condition will not occur unless and until the failed temperature sensor 46 has been replaced.

Figure 6:
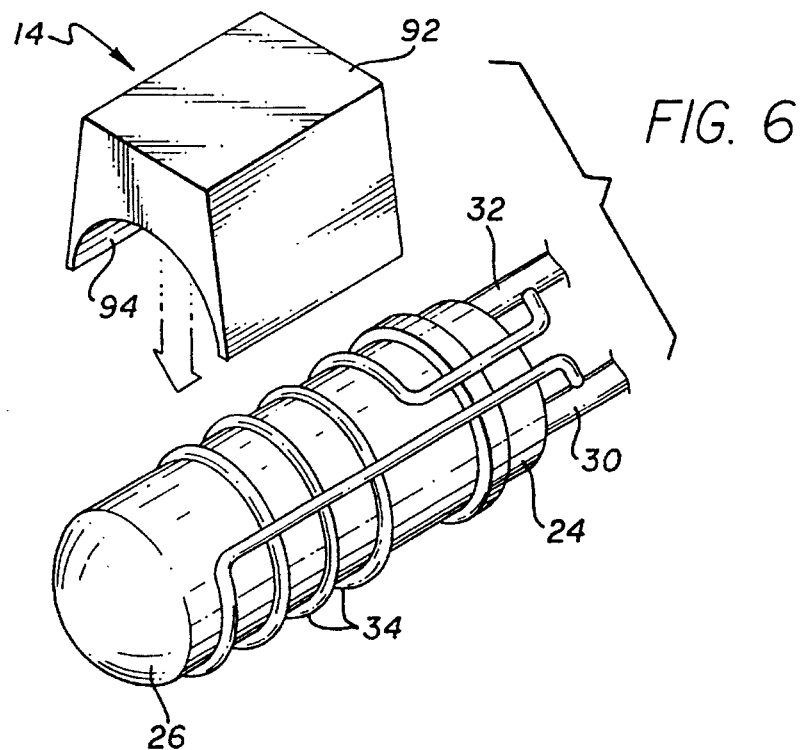
FIG. 6 is a fragmented exploded perspective view illustrating one preferred arrangement for installation of the spa control circuit.
Figure 7:
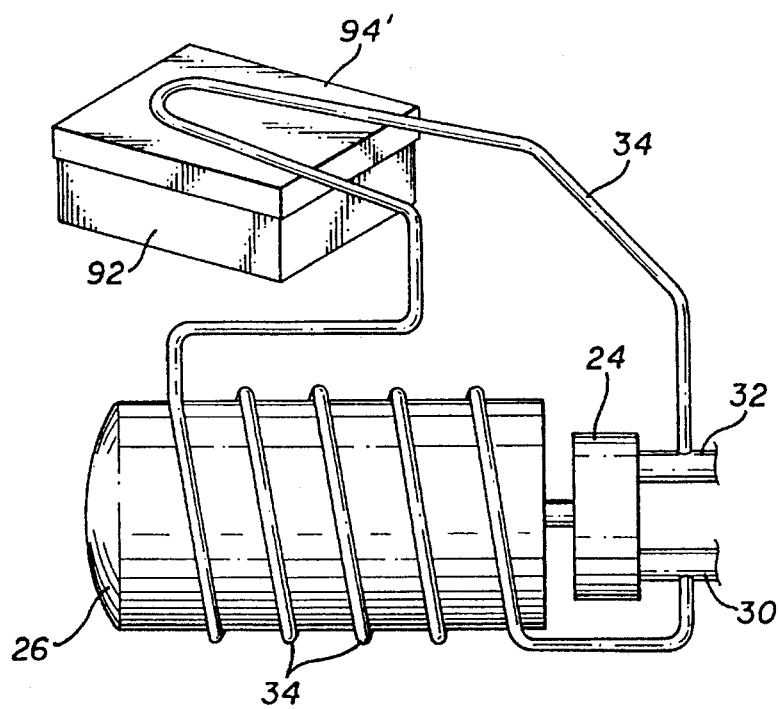
FIG. 7 is a fragmented perspective view illustrating an alternative arrangement for installation of the spa control circuit.

FIGS. 6 and 7 illustrate additional features of the invention, wherein the components of the spa control circuit 14 are packaged within a compact housing 92. As shown in FIG. 6, this housing 92 has a heat conductive wall 94 on one side thereof, having a shape for conformed installation in heat transfer relation with the heater flow conduit 34 coiled about the motor 26. FIG. 7 shows a similar geometry wherein a heat transfer wall 94' on the circuit-containing housing 92 is mounted in heat exchange relation with a portion of the heater flow conduit 34. In either case, the circulating spa water is used to carry heat away from and thus cool the electronic components of the control circuit, while additionally utilizing heat generated by the control circuit to assist in elevating the temperature of the spa water.

The improved control circuit 14 of the present invention thus provides reliable and safe operation of the spa. A single temperature sensor 46 is provided for use with both the thermostat and high temperature limit circuits 44 and 50. The safety circuit 82 prevents water overheating in the event of temperature sensor failure. The latching relay 74 insure automatic reset of the high temperature limit circuit 50 following a power interruption to provide resumed operation without manual reset, if appropriate. The arc suppression circuit 56 extends the operating life of the thermostat relay 42. Finally, the heat exchange mounting of control circuit components insure adequate cooling of the circuit while supplementing the motor 26 as a hear source.

A variety of further modifications and improvements to the spa control circuit shown in and described herein will be apparent to those skilled in the art. For example, while the invention is shown and described with respect to use in a spa or hot tub system, it will be understood that the control system may be adapted for use in safe temperature regulation in other therapeutic systems such as a sauna. Accordingly, no limitation is intended by way of the foregoing description and accompanying drawings, except as set forth in the appended claims.

What is claimed is:

1. A control circuit for a spa having a tub for receiving a supply of water and heater means energizable for heating the water, said control circuit comprising:

temperature sensor means responsive to the temperature of the water for generating a temperature signal representing water temperature;

switch means movable between opened and closed positions for de-energizing and energizing the heater means; and circuit means responsive to said temperature signal for moving said switch means between the opened and closed positions to prevent overheating of the water;

said circuit means including means for detecting failure of said temperature sensor means and for responding thereto to move said switch means to de-energize said heater means;

said switch means comprising a high temperature limit relay, and wherein said circuit means comprises a high temperature limit circuit responsive to said temperature signal for moving said high temperature limit relay to de-energize the heater means when the water temperature reaches a predetermined upper limit;

said switch means further comprising a thermostat relay, said circuit means having a thermostat circuit responsive to said temperature signal for moving said thermostat relay between opened and closed positions to respectively energize and de-energize the heater means to maintain the water temperature within the limits of a normal operating range less than said predetermined upper limit;

said temperature sensor means comprising a single temperature sensor for generating said temperature signal coupled to both of said high temperature limit and thermostat circuits;

said circuit means including manual reset means for moving said switch means to energize the heater means, said circuit means including temperature responsive mean and said means for detecting sensor failure for independently moving said switch means to de-energize the heater mean;

said circuit means further including a latching relay coupled to said switch means, said latching relay having a switch arm movable between a power-on position for moving said switch means to energize the heater means and a power-off position for moving said switch means to de-energize the heater means, said temperature responsive means and said means for detecting sensor failure being connected to said latching relay to move said switch arm to the power-off position respectively in response to the water temperature reaching said predetermined upper limit and in response to sensor failure, said manual reset means being connected to said latching relay to move said switch arm to the power-on position.

2. The control circuit of claim 1 wherein said circuit means further includes a timer circuit having a manually settable timer switch and means responsive to operation of said timer switch for moving said thermostat relay to the closed position for a selected time period irrespective of said thermostat circuit.

3. A control circuit for a spa having a tub for receiving a supply of water and heater means energizable for heating the water, said control circuit comprising:

temperature sensor means responsive to the temperature of the water for generating a temperature signal representing water temperature;

switch means movable between opened and closed positions for de-energizing and energizing the heater means; and circuit means responsive to said temperature signal for moving said switch means between the opened and closed positions to prevent overheating of the water;

said circuit means including means for detecting failure of said temperature sensor means and for responding thereto to move said switch means to de-energize said heater means;

said switch means comprising a high temperature limit relay, and wherein said circuit means comprises a high temperature limit circuit responsive to said temperature signal for moving said high temperature limit relay to de-energize the heater means when the water temperature reaches a predetermined upper limit;

said switch means further comprising a thermostat relay, said circuit means having a thermostat circuit responsive to said temperature signal for moving said thermostat relay between opened and closed positions to respectively energize and de-energize the heater means to maintain the water temperature within the limits of a normal operating range less than said predetermined upper limit;

said temperature sensor means comprising a single temperature sensor for generating said temperature signal coupled to both of said high temperature limit and thermostat circuits;

said thermostat relay including a pair of contacts, and further including an arc suppression circuit for substantially preventing arc formation across said thermostat relay contacts in response to movement of said thermostat relay between the opened and closed positions, said arc suppression circuit comprising a capacitor and a transient voltage suppressor connected across said contacts in parallel relation with each other.

4. The control circuit of claim 3 wherein said arc suppression circuit further comprises a resistor connected across said contacts in series with said capacitor, said transient voltage suppressor being connected across said contacts in parallel with said capacitor and resistor.

5. A control circuit for a spa having a tub for receiving a supply of water and heater means energizable for heating the water, said control circuit comprising:

temperature sensor means responsive to the temperature of the water for generating a temperature signal representing water temperature;

switch means movable between opened and closed positions for de-energizing and energizing the heater means;

circuit means responsive to said temperature signal for moving said switch means between the opened and closed positions to prevent overheating of the water;

said circuit means including means for detecting failure of said temperature sensor means and for responding thereto to move said switch means to de-energize said heater means;

said switch means comprising a high temperature limit relay, and wherein said circuit means comprises a high temperature limit circuit responsive to said temperature signal for moving said high temperature limit relay to de-energize the heater means when the water temperature reaches a predetermined upper limit;

said switch means further comprising a thermostat relay, said circuit means having a thermostat circuit responsive to said temperature signal for moving said thermostat relay between opened and closed positions to respectively energize and de-energize the heater means to maintain the water temperature within the limits of a normal operating range less than said predetermined upper limit;

said temperature sensor means comprising a single temperature sensor for generating said temperature signal coupled to both of said high temperature limit and thermostat circuits; and a housing having the components of the control circuit mounted therein, said housing including a heat transfer member in heat exchange relation with the water, whereby the components of the control circuit are cooled by the water and whereby heat generated by the components of the control circuit supplements the heater means to heat the water.

6. A control circuit for a spa having a tub for receiving a supply of water and heater means energizable for heating the water, said control circuit comprising:

a temperature sensor responsive to the water temperature to generate a temperature signal;

a thermostat relay and a high temperature limit relay connected in series between a power supply and the heater means, each of said relays being movable between opened and closed positions for energizing the heater means when both of said relays are in the closed positions and for de-energizing the heater means when one of said relays is in the opened position;

a thermostat circuit responsive to said temperature signal for moving said thermostat relay between the opened and closed positions to regulate water temperature with the limits of a selected normal range of operation;

a high temperature limit circuit responsive to said temperature signal for moving said high temperature limit relay between the opened and closed positions to de-energize the heater means when the water temperature reaches a predetermined upper limit higher than said normal range;

a safety circuit including means for detecting failure of said temperature sensor and for responding thereto to move at least one of said relay to the opened position to de-energize the heater means;

manual reset means for moving said high temperature limit relay to the closed position; and a latching relay having a switch arm movable between a power-on position and a power-off position for respectively moving said high temperature limit relay between said closed and opened positions, said high temperature limit circuit and said safety circuit being connected to said latching relay to independently move said switch arm to the power-off position respectively in response to the water temperature reaching said predetermined upper limit and in response to sensor failure, said manual reset means being connected to said latching to move said switch arm to the power-on position.

7. The control circuit of claim 6 wherein said safety circuit responds to failure of the sensor to move said high temperature limit relay to the opened position.

8. The control circuit of claim 6 wherein said thermostat relay includes a pair of contacts, and further including an arc suppression circuit for substantially preventing arc formation across said thermostat relay contacts in response to movement of said thermostat relay between the opened and closed positions.

9. A control circuit for a spa having a tub for receiving a supply of water and heater means energizable for heating the water, said control circuit comprising:

a temperature sensor responsive to the water temperature to generate a temperature signal;

a thermostat relay and a high temperature limit relay connected in series between a power supply and the heater means, each of said relays being movable between opened and closed positions for energizing the heater means when both of said relays are in the closed positions and for de-energizing the heater means when one of said relay in the opened position;

a thermostat circuit responsive to said temperature signal for moving said thermostat relay between the opened and closed positions to regulate water temperature with the limits of a selected normal range operation;

a high temperature limit circuit responsive to said temperature signal for moving said high temperature limit relay between the opened and closed positions to de-energize the heater means when the water temperature reaches a predetermined upper limit higher than said normal range;

a safety circuit including means for detecting failure of said temperature sensor and for responding thereto to move at least one of said relay to the opened position to de-energize the heater means; and a housing having the components of the control circuit mounted therein, said housing including a heat transfer member in heat exchange relation with the water, whereby the components of the control circuit are cooled by the water and whereby heat generated by the components of the control circuit supplements the heater means to heat the water.

10. A control circuit for a spa having a tub for receiving a supply of water and heater means energizable for heating the water, said control circuit comprising:

a temperature sensor responsive to the water temperature to generate a temperature signal;

a thermostat relay including a pair of contacts and being connected between a power supply and the heater means, said relay being movable between closed and opened positions for respectively energizing and de-energizing the heater means;

a thermostat circuit responsive to said temperature signal for moving said thermostat relay between the opened and closed positions to regulate water temperature with the limits of a selected normal range of operation; and an arc suppression circuit for substantially preventing arc formation across said thermostat relay contacts in response to movement of said thermostat relay between the opened and closed position;

said arc suppression circuit comprising a capacitor and resistor connected in series across said contacts, and a transient voltage suppressor connected across said contacts in parallel with said capacitor and resistor.

11. A control circuit for a spa having a tub for receiving a supply of water, heater means energizable for heating the water, and circulation means for circulating the water to said heating means, said control circuit comprising:

temperature sensor means responsive to the temperature of the water for generating a temperature signal representing water temperature;

switch means movable between opened and closed positions for de-energizing and energizing the heater means; and circuit means responsive to said temperature signal for moving said switch means between the opened and closed positions to regulate the temperature of the water; and a housing having the components of the control circuit mounted therein, said housing including a heat transfer member in heat exchange relation with the water circulated to the heater means, whereby the components of the control circuit are cooled by the water and whereby heat generated by the components of the control circuit supplements the heater means to heat the water.

12. An arc suppression circuit for substantially preventing arc formation across a relay having a pair of contacts and switch means for opening and closing said contacts, said arc suppression circuit comprising:

a capacitor and a resistor connected across said contacts in series relation; and a transient voltage suppressor connected across said contacts in parallel with said capacitor and resistor.

* * * * *